US009133876B2

(12) United States Patent
Ina et al.

(10) Patent No.: US 9,133,876 B2
(45) Date of Patent: Sep. 15, 2015

(54) WHEEL BEARING DEVICE

(71) Applicant: JTEKT CORPORATION, Osaka-shi, Osaka (JP)

(72) Inventors: Yoshiyuki Ina, Osaka (JP); Toshihiro Hakata, Kashiwara (JP); Masaki Maeda, Nisshin (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/572,244

(22) Filed: Dec. 16, 2014

(65) Prior Publication Data

US 2015/0176642 A1     Jun. 25, 2015

(30) Foreign Application Priority Data

Dec. 25, 2013   (JP) ................. 2013-266865

(51) Int. Cl.
| | |
|---|---|
| *F16C 13/00* | (2006.01) |
| *F16C 19/50* | (2006.01) |
| *B60B 27/00* | (2006.01) |
| *F16C 19/18* | (2006.01) |

(52) U.S. Cl.
CPC ........... *F16C 19/505* (2013.01); *B60B 27/0005* (2013.01); *B60B 27/0094* (2013.01); *F16C 19/186* (2013.01); *F16C 2240/80* (2013.01); *F16C 2326/02* (2013.01)

(58) Field of Classification Search
CPC ............... F16C 19/183–19/187; F16C 19/385; F16C 19/386; F16C 2326/02; B60B 27/0005; B60B 27/001; B60B 27/0094
USPC ......................................................... 384/516
See application file for complete search history.

(56) References Cited

U.S. PATENT DOCUMENTS

| | | | | |
|---|---|---|---|---|
| 5,226,737 | A * | 7/1993 | Sandy, Jr. ...................... | 384/512 |
| 7,104,695 | B2 * | 9/2006 | Shevket ........................ | 384/450 |
| 7,862,242 | B2 * | 1/2011 | Ohtsuki ........................ | 384/544 |
| 2009/0220183 | A1 | 9/2009 | Meeker et al. | |
| 2010/0046870 | A1 | 2/2010 | Shibuya et al. | |

FOREIGN PATENT DOCUMENTS

| | | |
|---|---|---|
| JP | A-2004-108449 | 4/2004 |
| JP | A-2009-250297 | 10/2009 |

OTHER PUBLICATIONS

Apr. 29, 2015 Extended Search Report issued in European Patent Application No. 14198991.3.

* cited by examiner

*Primary Examiner* — James Pilkington
(74) *Attorney, Agent, or Firm* — Oliff PLC

(57) ABSTRACT

A wheel bearing device includes: an inner shaft; an inner ring; an outer ring; and first and second rolling element groups. The first rolling element group is disposed on the vehicle outer side. The second rolling element group is disposed on the vehicle inner side. The first and second rolling element groups have the same contact angle and the same number of balls. A relationship between a ball diameter D1 of the first rolling element group and a ball diameter D2 of the second rolling element group is set such that an inequality D1>D2 is satisfied. A relationship between a pitch circle diameter PCD1 of the first rolling element group and a pitch circle diameter PCD2 of the second rolling element group is set such that an equation PCD1=D1/D2×PCD2 is satisfied.

1 Claim, 1 Drawing Sheet

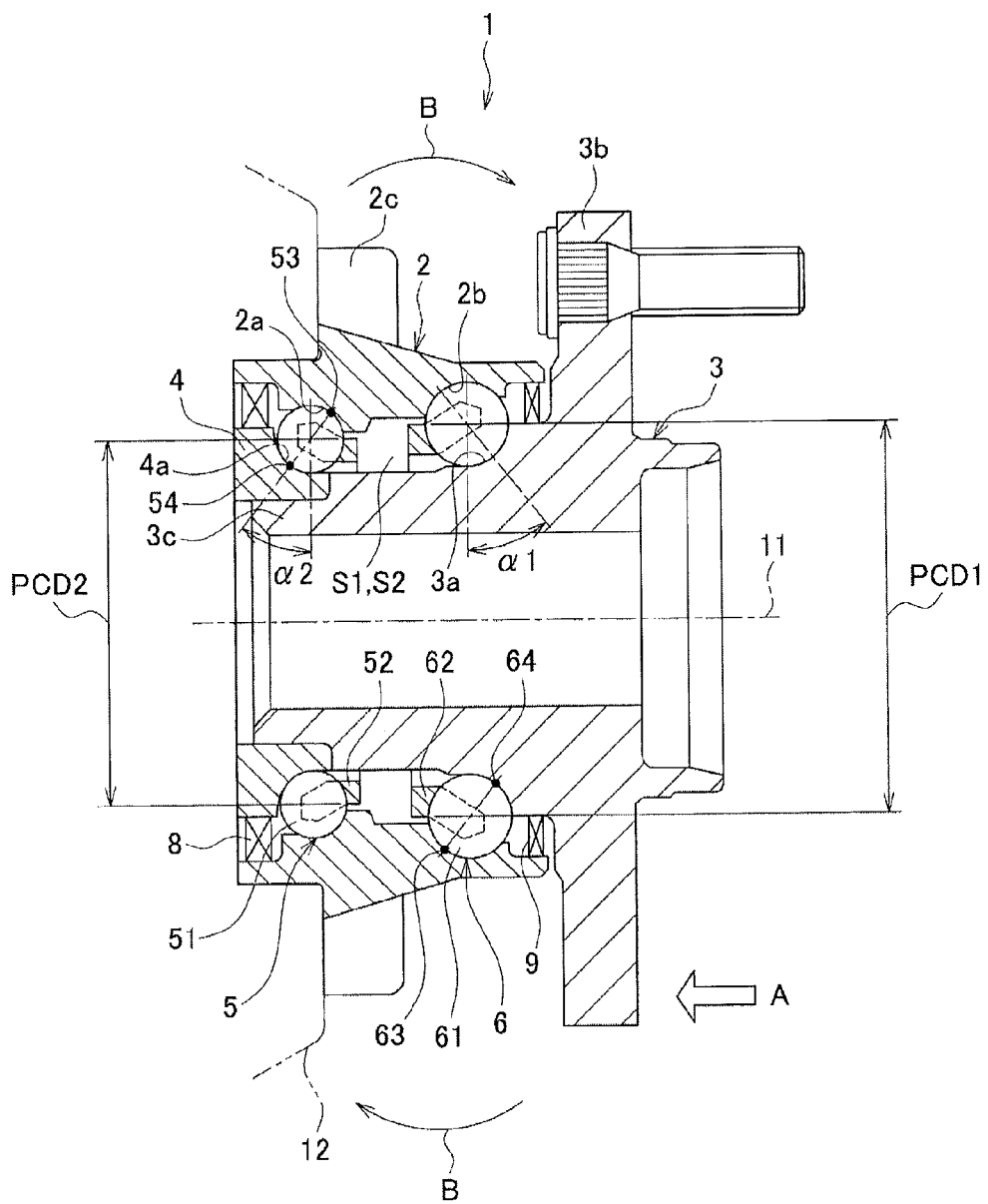

WHEEL BEARING DEVICE

INCORPORATION BY REFERENCE

The disclosure of Japanese Patent Application No. 2013-266865 filed on Dec. 25, 2013 including the specification, drawings and abstract, is incorporated herein by reference in its entirety.

BACKGROUND OF THE INVENTION

1. Field of the Invention

The invention relates to a wheel bearing device.

2. Description of the Related Art

A wheel bearing device that supports a wheel of a vehicle includes an outer ring, an inner ring, rolling elements, and a cage, as described in, for example, Japanese Patent Application Publication No. 2009-250297 (JP 2009-250297 A). The outer ring is fixed to a vehicle side fixing member disposed on the inner side (inboard side) in the vehicle lateral direction (hereinafter, referred to as "vehicle inner side"). The inner ring is fitted to a wheel disposed on the outer side (outboard side) in the vehicle lateral direction (hereinafter, referred to as "vehicle outer side"). The rolling elements are disposed in two rows arranged in the axial direction of the wheel bearing device, at positions between the inner ring and the outer ring. The cage retains the rolling elements arranged in the circumferential direction of the wheel bearing device.

For example, when the wheel equipped with a tire hits a curb, which is disposed along a road and forms an edge of a sidewalk, from the side while the vehicle is travelling, an impact moment load around the axis of the wheel bearing device is applied via the tire to a portion of the wheel bearing device, which is located vertically below the axis. As a result, the moment load turns into a rolling element load that is applied largely to a portion of the wheel bearing device, which is located vertically below the axis, on the vehicle outer side, and applied largely to a portion of the wheel bearing device, which is located vertically above the axis, on the vehicle inner side. In the wheel bearing device, indentations are formed in both the raceway surfaces of inner and outer rings, to which an excessive rolling element load is applied, and these indentations contribute to noise generation.

As a wheel bearing device with an improved rigidity against a moment load, there is a wheel bearing device of a so-called different-sized PCD type, as described in Japanese Patent Application Publication No. 2004-108449 (JP 2004-108449 A). Specifically, a first rolling element group disposed on the vehicle outer side has a larger pitch circle diameter (pitch diameter of ball set) PCD and a larger number of balls than those of a second rolling element group disposed on the vehicle inner side. In this wheel bearing device, the PCD is set larger on the vehicle outer side, on which a rolling element load is likely to be larger due to the closeness to the wheel and there is more flexibility in layout, than on the vehicle inner side on which the flexibility in layout is limited due to the influence of the vehicle side fixing member. In this way, the static load rating on the vehicle outer side is increased, and formation of indentations in the raceway surfaces is restricted.

If the wheel bearing device described in JP 2004-108449 A receives an excessive impact moment load beyond a permissible value of the static load rating, indentations may occur in both the raceway surfaces on the vehicle inner side and the vehicle outer side at the same time. In the bearing device in which indentations are formed, noise is generated as the rolling elements sequentially roll on the indentations formed in the raceway surfaces. In the wheel bearing device in JP 2004-108449 A, because the first rolling element group and the second rolling element group are different from each other in the PCD and the number of rolling elements, the revolution speed of the rolling elements is different between the vehicle inner side and the vehicle outer side. This results in a slight difference in cycle of noise generation between the vehicle inner side and the vehicle outer side. The slight difference in the cycle, that is, frequency of noise generation causes a difference in frequency, which generates a beat. Such a beat gives an occupant an uncomfortable feeling. Thus, it is necessary to increase the static load rating on the vehicle outer side and to reduce a beat due to indentations in a wheel bearing device of a different-sized PCD type.

SUMMARY OF THE INVENTION

One object of the invention is to provide a wheel bearing device of a different-sized PCD type, which is configured to increase the static load rating on the vehicle outer side and to reduce a beat due to indentations.

An aspect of the invention relates to a wheel bearing device including: an inner ring having a flange formed on an outer peripheral face, at a position on one side in an axial direction of the wheel bearing device, and having two rows of raceway surfaces in the axial direction that are a first inner ring raceway surface and a second inner ring raceway surface that are formed on the outer peripheral face, at a position on the other side in the axial direction; an outer ring having a flange formed on an outer peripheral face, at a position on the other side in the axial direction, and having two rows of raceway surfaces in the axial direction that are a first outer ring raceway surface and a second outer ring raceway surface that are formed on an inner peripheral face so as to face the first inner ring raceway surface and the second inner ring raceway surface, respectively, in a radial direction of the wheel bearing device; and two rows of rolling element groups in the axial direction that are a first rolling element group and a second rolling element group, the first rolling element group being interposed between the first outer ring raceway surface and the first inner ring raceway surface, and the second rolling element group being interposed between the second outer ring raceway surface and the second inner ring raceway surface. One of the flange of the inner ring and the flange of the outer ring is connected to a wheel disposed on a vehicle outer side. The other one of the flange of the inner ring and the flange of the outer ring is connected to a vehicle side fixing member disposed on a vehicle inner side. The first rolling element group is disposed on the vehicle outer side. The second rolling element group is disposed on the vehicle inner side. A contact angle of the first rolling element group and a contact angle of the second rolling element group are equal to each other, and the number of balls of the first rolling element group and the number of balls of the second rolling element group are equal to each other. A relationship between a ball diameter D1 of the first rolling element group and a ball diameter D2 of the second rolling element group is set such that an inequality D1>D2 is satisfied. A relationship between a pitch circle diameter PCD1 of the first rolling element group and a pitch circle diameter PCD2 of the second rolling element group is set such that an equation PCD1=D1/D2×PCD2 is satisfied.

BRIEF DESCRIPTION OF THE DRAWINGS

The foregoing and further features and advantages of the invention will become apparent from the following descrip- FIG. 1 is a sectional view illustrating a hub unit including a wheel bearing device according to an embodiment of the invention, taken along the axial direction of the hub unit.

DETAILED DESCRIPTION OF EMBODIMENTS

Hereinafter, a wheel bearing device according to an embodiment of the invention will be described with reference to the accompanying drawing. FIG. 1 is a sectional view of a hub unit 1 including the wheel bearing device according to the embodiment of the invention, taken along the axial direction of the hub unit 1. In the following description, "vehicle inner side" means the side on which an axle is disposed and signifies the left side in the drawing, whereas "vehicle outer side" means the side on which a wheel is disposed and signifies the right side in the drawing.

As illustrated in FIG. 1, the hub unit 1 (wheel bearing device) is used, for example, for a front wheel (for a drive wheel) of a front-wheel-drive vehicle, and has a structure of a double row angular contact ball bearing with vertex of contact angles outside of bearing. Specifically, the hub unit 1 includes an outer ring 2, an inner shaft 3 (inner ring), an inner ring 4, and rolling elements disposed in two rows. The outer ring 2 is fixed to a knuckle 12, which may function as a vehicle side fixing member disposed on the vehicle inner side. The inner shaft 3 is disposed centering on an axis 11 of the outer ring 2 so as to extend parallel to the axis 11. A wheel (not illustrated) disposed on the vehicle outer side is fitted to the inner shaft 3. The inner ring 4 is fitted onto the outer peripheral face of a fit portion 3c that is formed, as a part of the inner shaft 3, at the vehicle inner side end portion of the inner shaft 3. The rolling elements are arranged in the circumferential direction of the hub unit 1, at positions between the outer ring 2 and the inner shaft 3 and at positions between the outer ring 2 and the inner ring 4.

A fitting flange 2c (flange), which protrudes outward in the radial direction and which is fixed to the knuckle 12, is formed on the outer peripheral face of the outer ring 2. For example, high carbon steel "S55C" is used as the material of the outer ring 2.

A flange 3b, which protrudes outward in the radial direction and to which the wheel is fitted, is formed at the vehicle outer side end portion of the inner shaft 3. For example, high carbon steel "S55C" is used as the material of the inner shaft 3.

The inner ring 4 is press-fitted onto the fit portion 3c and thus fixedly fitted to the fit portion 3c. For example, high carbon-chromium bearing steel material "SUJ2" is used as the material of the inner ring 4.

An annular space S1, in which the rolling elements are disposed, is formed at a position between the outer ring 2 and the inner shaft 3 and a position between the outer ring 2 and the inner ring 4. In the annular space S1, an annular sealing device 9 is installed on the vehicle outer side and an annular sealing device 8 is installed on the vehicle inner side. The sealing device 9 and the sealing device 8 defines a bearing internal space S2 which is sealed such that the relative rotation between the outer ring 2, and the inner shaft 3 and the inner ring 4 is allowed.

The hub unit 1 is a hub unit of a so-called different-sized PCD type. The hub unit 1 includes bearings arranged in two rows so as to be fixedly fitted together, that is, a first bearing 6 disposed on the vehicle outer side and a second bearing 5 disposed on the vehicle inner side.

In the first bearing 6, a first rolling element group 61 is retained by a first cage 62. The first rolling element group 61 is a plurality of spherical balls that roll between a first outer ring raceway surface 2b formed on the inner peripheral face of the outer ring 2 and a first inner ring raceway surface 3a formed on the outer peripheral face of the inner shaft 3.

In the second bearing 5, a second rolling element group 51 is retained by a second cage 52. The second rolling element group 51 is a plurality of spherical balls that roll between a second outer ring raceway surface 2a formed on the inner peripheral face of the outer ring 2 and a second inner ring raceway surface 4a formed on the outer peripheral face of the inner ring 4.

The first rolling element group 61 and the second rolling element group 51 have the same configuration. That is, the contact angle $\alpha 1$ of the first rolling element group 61 and the contact angle $\alpha 2$ of the second rolling element group 51 are each 40°, and the number of balls of the first rolling element group 61 and the number of balls of the second rolling element group 51 are each 12. A ball diameter D1 of each of the balls of the first rolling element group 61 is set to, for example, 13.5 mm, whereas a ball diameter D2 of each of the balls of the second rolling element group 51 is set to, for example, 12.7 mm. The relationship between a pitch circle diameter (pitch diameter of ball set) PCD1 of the first rolling element group 61 and a pitch circle diameter (pitch diameter of ball set) PCD2 of the second rolling element group 51 is set such that an equation PCD1=D1/D2×PCD2 is satisfied. For example, when the pitch circle diameter PCD2 is 53.3 mm, PCD1 is set to 56.6 mm according to an equation PCD1=13.5/12.7×53.3. That is, the ratio between the pitch circle diameter PCD1 and the ball diameter D1 of the first rolling element group 61 is set equal to the ratio between the pitch circle diameter PCD2 and the ball diameter D2 of the second rolling element group 51, and the pitch circle diameter PCD1 is set larger than the pitch circle diameter PCD2.

A revolution speed V1 of the balls of the first rolling element group 61 is expressed by the following expression (1).

$$V1=(1-\gamma)V/2 \quad (1)$$

In the expression (1), $\gamma$ is a coefficient, and V is a rotational speed of the inner shaft 3.

In this case, the coefficient $\gamma$ is expressed by the following expression (2).

$$\gamma = D1 \times \cos \alpha 1 / PCD1 \quad (2)$$

In the expression (2), D1 is a ball diameter, $\alpha 1$ is a contact angle, and PCD1 is a pitch circle diameter.

The revolution speed V2 of the balls of the second rolling element group 51 is derived in the same manner as that in the case of the first rolling element group 61. As expressed by the expressions (1), (2), because the contact angle $\alpha 1$ of the first rolling element group 61 and the contact angle $\alpha 2$ of the second rolling element group 51 are equal to each other as described above, the revolution speed V1 of the balls of the first rolling element group 61 and the revolution speed V2 of the balls of the second rolling element group 51 are determined by the ratio between the ball diameter D1 and the pitch circle diameter PCD1 and the ratio between the ball diameter D2 and the pitch circle diameter PCD2. As described above, the ratio between the pitch circle diameter PCD1 and the ball diameter D1 is set equal to the ratio between the pitch circle diameter PCD2 and the ball diameter D2. Thus, the revolution speed V1 of the balls of the first rolling element group 61 and the revolution speed V2 of the balls of the second rolling element group 51 are equal to each other.

Next, the action of the hub unit 1 upon application of an impact moment load to the flange 3b will be described. For example, when the wheel equipped with a tire hits a curb, which is disposed along a road and forms an edge of a sidewalk, from the side while the vehicle is travelling, an impact moment load around the axis 11, the impact moment load acting in the direction of an arrow A, is applied via the tire to a portion of the hub unit 1, which is located vertically below the axis 11 of the flange 3b. As a result, the inner shaft 3 rotates slightly around the axis 11 in the direction of an arrow B.

The moment load applied to the flange 3b turns into a rolling element load that is applied mainly to a portion of the hub unit 1, which is located vertically below the axis 11, on the vehicle outer side, and applied mainly to a portion of the hub unit 1, which is located vertically above the axis 11, on the vehicle inner side. Specifically, on the vertically lower side with respect to the axis 11 in the hub unit 1, the first rolling element group 61 comes into contact with the first outer ring raceway surface 2b at a contact portion 63 and comes into contact with the first inner ring raceway surface 3a at a contact portion 64, on the vehicle outer side. On the other hand, on the vertically upper side with respect to the axis 11 in the hub unit 1, the second rolling element group 51 comes into contact with the second outer ring raceway surface 2a at a contact portion 53 and comes into contact with the second inner ring raceway surface 4a at a contact portion 54, on the vehicle inner side. In this case, if the moment load is an excessively high load that exceeds a permissible value of static load rating, indentations may be formed in the contact portion 63 and the contact portion 64 on the vehicle outer side, and in the contact portion 53 and the contact portion 54 on the vehicle inner side, at the same time.

As described above, in the hub unit 1 according to the present embodiment, because the pitch circle diameter PCD1 and the ball diameter D1 of the first rolling element group 61 located on the vehicle outer side are set larger than the pitch circle diameter PCD2 and the ball diameter D2 of the second rolling element group 51 located on the vehicle inner side, respectively, the static load rating on the vehicle outer side is increased.

In the hub unit 1 according to the present embodiment, the contact angle $\alpha 1$ of the first rolling element group 61 and the contact angle $\alpha 2$ of the second rolling element group 51 are set equal to each other. In addition, the ratio between the pitch circle diameter PCD1 and the ball diameter D1 of the first rolling element group 61 is set equal to the ratio between the pitch circle diameter PCD2 and the ball diameter D2 of the second rolling element group 51. Thus, the revolution speed V1 of the balls of the first rolling element group 61 and the revolution speed V2 of the balls of the second rolling element group 51 are equal to each other. The number of the balls of the first rolling element group 61 and the number of the balls of the second rolling element group 51 are set equal to each other. Therefore, when indentations are formed in the first inner ring raceway surface 3a and the first outer ring raceway surface 2b, and in the second inner ring raceway surface 4a and the second outer ring raceway surface 2a, at the same time, the cycle (frequency) at which the balls of the first rolling element group 61 sequentially roll on the indentations formed in the corresponding raceway surfaces and the cycle (frequency) at which the balls of the second rolling element group 51 sequentially roll on the indentations formed on the corresponding raceway surfaces are equal to each other. Thus, a beat is less likely to be generated, and, as a result, the beat due to the indentations is reduced. Note that, a beat is a sound that is generated due to a difference in frequency between the noises that are generated when the balls sequentially roll on the indentations formed in the corresponding raceway surfaces.

The invention is not limited to the embodiment described above, and may be implemented in various other embodiments within the scope of the appended claim. In the above embodiment, the configuration for a drive wheel has been described. However, the invention may be applied to a driven wheel.

In the embodiment described above, the hub unit 1 is a hub unit of an inner ring rotation type, in which the inner shaft 3 and the inner ring 4 rotate. However, the invention is not limited to this example. The invention may be applied, for example, to the configuration of a hub unit of an outer ring rotation type, in which an outer ring rotates.

According to the invention, it is possible to provide the wheel bearing device of a different-sized PCD type, which is configured to increase the static load rating on the vehicle outer side and to reduce a beat due to indentations.

What is claimed is:

1. A wheel bearing device comprising:
    an inner ring having a flange formed on an outer peripheral face, at a position on one side in an axial direction of the wheel bearing device, and having two rows of raceway surfaces in the axial direction that are a first inner ring raceway surface and a second inner ring raceway surface that are formed on the outer peripheral face, at a position on the other side in the axial direction;
    an outer ring having a flange formed on an outer peripheral face, at a position on the other side in the axial direction, and having two rows of raceway surfaces in the axial direction that are a first outer ring raceway surface and a second outer ring raceway surface that are formed on an inner peripheral face so as to face the first inner ring raceway surface and the second inner ring raceway surface, respectively, in a radial direction of the wheel bearing device; and
    two rows of rolling element groups in the axial direction that are a first rolling element group and a second rolling element group, the first rolling element group being interposed between the first outer ring raceway surface and the first inner ring raceway surface, and the second rolling element group being interposed between the second outer ring raceway surface and the second inner ring raceway surface, wherein
    one of the flange of the inner ring and the flange of the outer ring is connected to a wheel disposed on a vehicle outer side,
    the other one of the flange of the inner ring and the flange of the outer ring is connected to a vehicle side fixing member disposed on a vehicle inner side,
    the first rolling element group is disposed on the vehicle outer side,
    the second rolling element group is disposed on the vehicle inner side,
    a contact angle of the first rolling element group and a contact angle of the second rolling element group are equal to each other, and the number of balls of the first rolling element group and the number of balls of the second rolling element group are equal to each other,
    a relationship between a ball diameter D1 of the first rolling element group and a ball diameter D2 of the second rolling element group is set such that an inequality D1>D2 is satisfied, and
    a relationship between a pitch circle diameter PCD1 of the first rolling element group and a pitch circle diameter PCD2 of the second rolling element group is set such that an equation $PCD1=D1/D2 \times PCD2$ is satisfied.

* * * * *